United States Patent
Lanfranchi

(10) Patent No.: US 7,246,701 B2
(45) Date of Patent: Jul. 24, 2007

(54) MACHINE FOR ORIENTING, STRAIGHTENING AND ALIGNING PLASTIC VESSELS OR BOTTLES

(75) Inventor: Lino Lanfranchi, Collecchio (IT)

(73) Assignee: Lanfranchi S.R.L., Collecchio (Parma) (IT)

( * ) Notice: Subject to any disclaimer, the term of this patent is extended or adjusted under 35 U.S.C. 154(b) by 0 days.

(21) Appl. No.: 10/542,348

(22) PCT Filed: Feb. 4, 2004

(86) PCT No.: PCT/IT2004/000037

§ 371 (c)(1),
(2), (4) Date: Jul. 14, 2005

(87) PCT Pub. No.: WO2004/069693

PCT Pub. Date: Aug. 19, 2004

(65) Prior Publication Data

US 2006/0118385 A1   Jun. 8, 2006

(30) Foreign Application Priority Data

Feb. 6, 2003   (IT) .......................... PR2003A0006

(51) Int. Cl.
*B65G 21/00* (2006.01)
*B65G 41/00* (2006.01)
*B65G 47/14* (2006.01)
*B65G 47/24* (2006.01)

(52) U.S. Cl. .................................. 198/860.1; 198/396

(58) Field of Classification Search ........... 198/397.02, 198/443, 444, 860.1, 400, 396, 397.01; 193/44
See application file for complete search history.

(56) References Cited

U.S. PATENT DOCUMENTS

| | | | | | |
|---|---|---|---|---|---|
| 3,339,703 | A | * | 9/1967 | Pinkham et al. | ............. 198/383 |
| 4,681,209 | A | * | 7/1987 | Marti | .......................... 198/392 |
| 5,400,893 | A | * | 3/1995 | Spatafora | ..................... 198/396 |
| 5,415,322 | A | * | 5/1995 | Sala | ............................. 221/169 |
| 5,996,768 | A | * | 12/1999 | Boyce et al. | ........... 198/397.01 |
| 6,116,406 | A | * | 9/2000 | Marti Sala | ................... 198/395 |
| 6,302,258 | B1 | * | 10/2001 | Verona | ........................ 198/392 |

FOREIGN PATENT DOCUMENTS

| | | |
|---|---|---|
| EP | 0 374 107 | 6/1990 |
| EP | 1 209 103 | 5/2002 |
| WO | WO 98/21129 | 5/1998 |

* cited by examiner

*Primary Examiner*—Gene O Crawford
*Assistant Examiner*—Ramya G. Prakasam
(74) *Attorney, Agent, or Firm*—Young & Thompson

(57) ABSTRACT

The invention refers to the field of machines for orienting, straightening and aligning plastic vessels such as bottles, and in particular the invention refers to those types of machines that provide for a hopper for randomly loading the bottles that are composed of a cylindrical rotating wall (1) carrying on its external face a plurality of cradles (5) with below-placed discharging channels (8) that are substantially funnel-shaped and a carousel (7) carrying a plurality of separators (9) composing vertical channels of openings (10) in a multiple number of dischargers minus one. The machine provides a mechanical speed gear (50) for changing the speed of the separators-carrying carousel (7) with respect to the speed of the cylindrical rotating wall (1). A mechanical phase change gear (37) is further provided for changing the angular position of the separators-carrying carousel with respect to the cylindrical rotating wall.

2 Claims, 4 Drawing Sheets

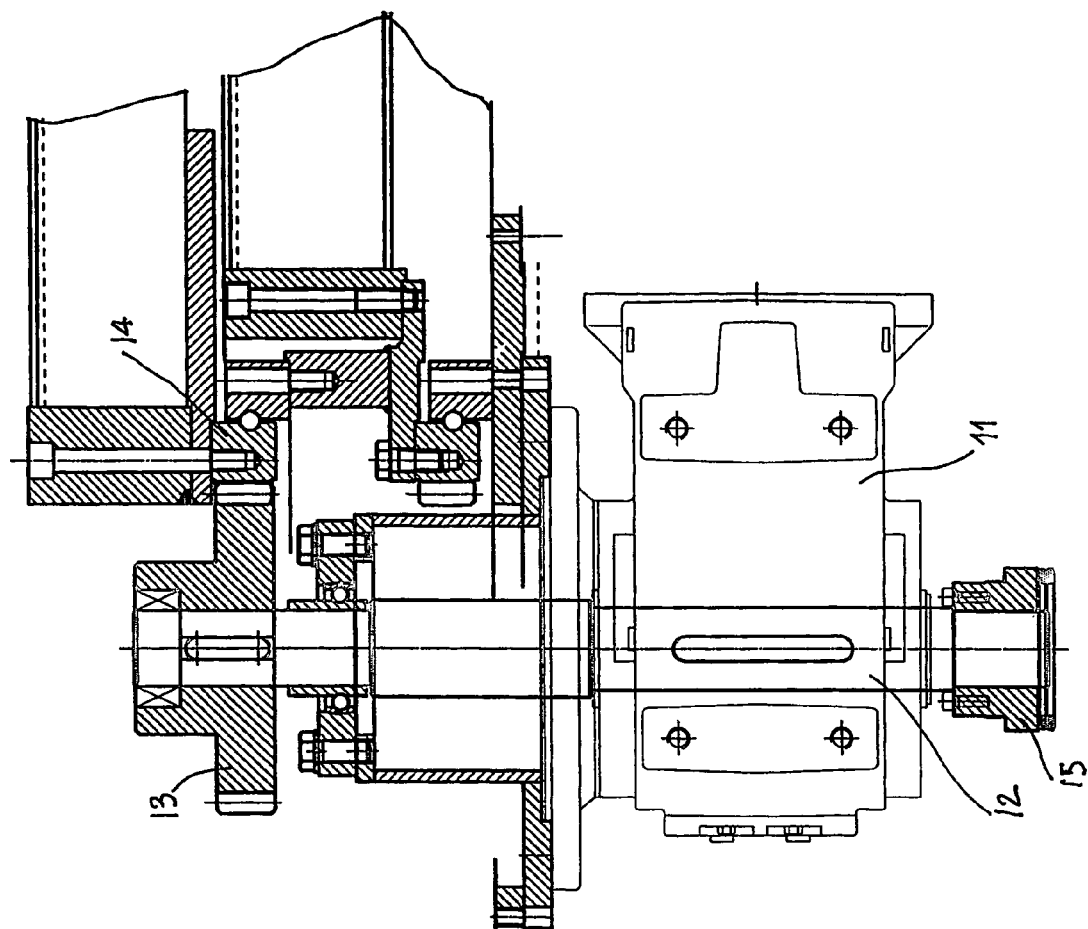
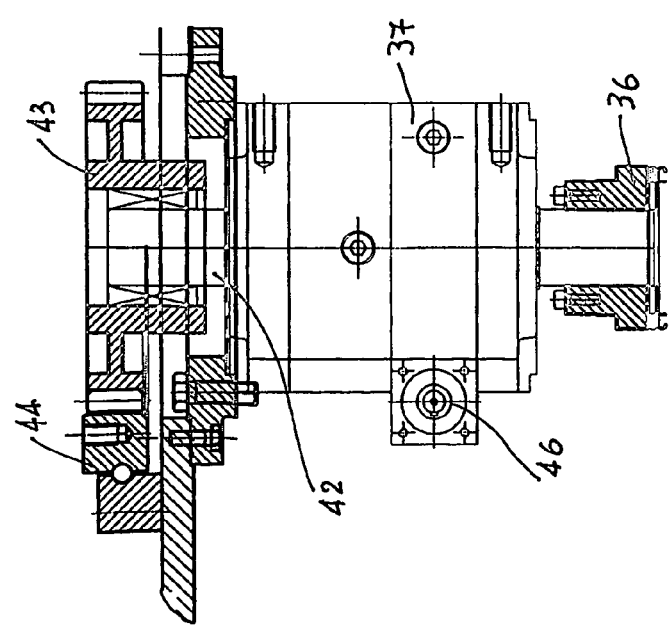
FIG. 2

MACHINE FOR ORIENTING, STRAIGHTENING AND ALIGNING PLASTIC VESSELS OR BOTTLES

BACKGROUND OF THE INVENTION

Object of the present invention is a machine for orienting, straightening and aligning plastic vessels or bottles.

In particular, the present invention refers to those types of machines disclosed, for example, in Italian Patent n. 1,287, 097 of the same Applicant, in which a hopper is provided in which bottles to be supplied are randomly and disorderly launched.

This hopper is substantially composed of a cylindrical wall rotating around a vertical axis.

On the external face of the cylindrical wall, a plurality of cradles are placed with below-placed dischargers that are substantially funnel-shaped, while on the internal face of the cylindrical rotating wall there are means for taking the bottles from the generally tapered bottom to the upper end of the cylindrical wall, where they fall into the above-mentioned cradles.

A carousel is provided in said machines, such carousel carrying a plurality of separators composing a plurality of vertical channels or openings in a number that is a multiple of the dischargers minus one.

The plurality of vertical channels or openings are arranged below the dischargers.

The below briefly described machines are currently equipped with means for changing the cradle and discharger sizes depending on the format change of vessels or bottles.

It has been found that, when the bottle format changes, current machines have not an optimum yield, since it is not possible to change the number of revolutions of the separators-carrying carousel with respect to the number of revolutions of the cylindrical rotating wall.

Another inconvenience is that, in currently known types of machines, it is not possible to change the phase between cylindrical rotating wall and separators-carrying carousel.

In fact, it has been found that, depending on bottle sizes, the bottle dropping times in dischargers change due to wears and bounces against discharger walls.

The dropping times that change depending on bottle shape and sizes changing according to the speed of the dischargers-carrying cylindrical wall.

An optimum case would be the perfect phase between discharger and separator when the bottle arrives in the low discharger part and is about to enter the channel made of two nearby separators.

It has been attempted to solve the problem, for example in EP-A-1 209 103, by providing two independent motorizations or through electric or electronic adjustments.

It has been found that electric adjustments do not ensure the repeatability of phasing and speed changing operations and further the control system is difficult and with possible maintenance costs since it requires specialized workers.

SUMMARY OF THE INVENTION

Object of the present invention is reaching a situation that is as much as possible next to the optimum situation depending on the vessel format change, by intervening on two parameters: ratio of rotating speeds of cylindrical rotating wall and separators-carrying carousel and angular position between the above elements, even with moving machines.

A further object of the present invention is intervening on the above-said parameters with mechanical means that guarantee the repeatability of situations, with a single electric motorization to carry out both above-described rotations.

These objects are fully reached by the machine for orienting, straightening and aligning plastic vessels or bottles object of the present invention, that is characterised in what is provided in the below-listed claims, and in particular in that it comprises a single motorization to carry out the rotation of cylindrical rotating wall and separators-carrying carousel, a mechanical speed gear being provided for changing the separators carousel speed with respect to the cylindrical rotating wall speed.

BRIEF DESCRIPTION OF THE DRAWINGS

This and other characteristics will be better pointed out by the following description of a preferred embodiment shown, merely as a non-limiting example, in the enclosed tables of drawing in which:

FIG. 2 shows an elevation view of the upper part of the motorization of rotating cylinder and separators-carrying carousel;

DESCRIPTION OF THE PREFERRED EMBODIMENTS

Figure 1:
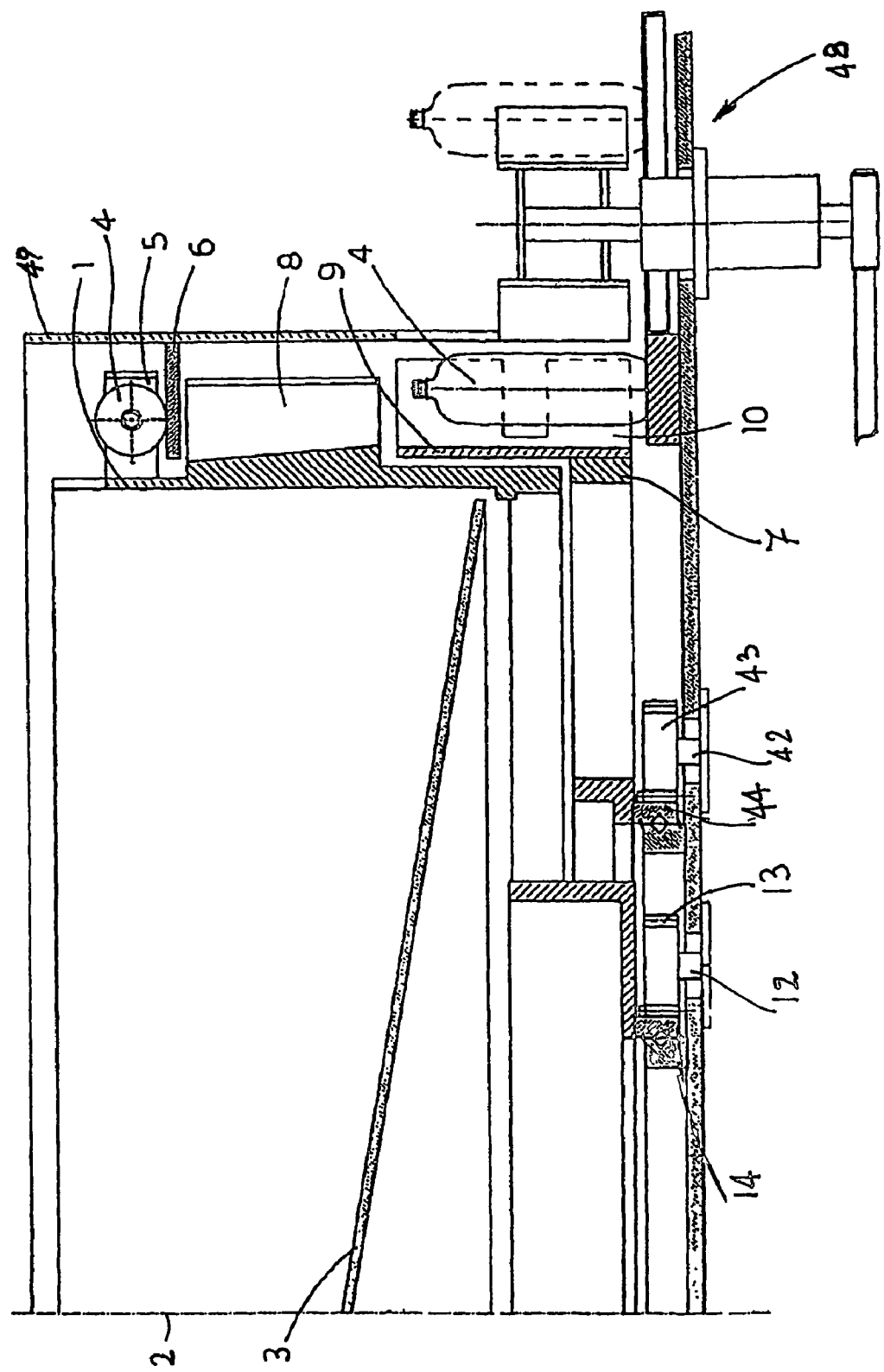
FIG. 1 shows an elevation view of a portion of a machine for pointing out the cylindrical rotating wall and the separators carousel.

With reference to FIG. 1, reference character 1 designates a cylindrical wall rotating around a vertical axis 2.

The cylindrical rotating wall is closed on its bottom by a tapered base 3 to form an hopper in which vessels or bottles 4 are randomly launched.

On the external face of the cylindrical rotating wall a plurality of cradles 5 are applied, onto which vessels 4 come to abut and are taken above the edge of the cylindrical rotating wall through not shown means of a known type. A fixed cylindrical wall 49 wraps the cylindrical wall 1 in order to form a toroidal opening in which said cradles are housed.

For a certain arc of circumference, under the cradles 5, an horizontal wall 6 is provided that separates them from below-placed vertical discharging channels 8 that take the bottles to be straightened and vertically fall in below channels or openings 10 formed by separators 9 carried by a rotating carousel 17, as will be better described below.

Reference 11 designates a motor-reducer that rotates a first shaft 12 onto whose upper end a toothed wheel 13 is keyed-in, such wheel meshing with a fifth wheel 14 that is integral with the rotating cylindrical wall 1 inside which plastic bottles are randomly thrown.

On its lower part, the shaft 12 is connected, through a joint 15, to a vertical driven shaft 16 supported by two hubs 17 and 18 supported by plates 19 and 20 that are integral with the machine frame.

On the shaft 16, two toothed wheels 21 and 22, whose diameter and number of teeth are equal, are idly assembled.

Always on the shaft 16, between the two toothed wheels 21 and 22, a grooved wheel 23 is keyed-in, that can vertically translate also during the rotating movement given to the shaft 16; in fact, the coupling between shaft and grooved wheel is realised through grooves obtained on the shaft with which teeth are engaged, that are obtained inside the grooved wheel hub.

Inside the groove 23a of the grooved wheel 23, two small rollers 24 are inserted and are opposed and idly supported by two arms 25 of a fork 26 pivoting around a pin 27 fixed to the machine frame.

The two arms 25 of the fork are joined by a bar 28 to which the head 29 of the stem of a pneumatic cylinder 30 is hinged, the liner of such cylinder being integral with the machine frame.

On each of the opposed faces of the grooved pulley, three stakes 31 are secured, that can penetrate into corresponding seats 32 obtained in the toothed wheels 21 and 22.

On the plates 19 and 20, two hubs 33 and 34 are secured, that support a second shaft 35 connected through a joint 36 to a phase changer 37.

On the shaft 35, two toothed wheels 38 and 39 are keyed-in, such wheels being connected through chains 40 and 41 respectively to the toothed wheels 21 and 22 in order to receive their rotating movement.

The toothed wheels 38 and 39 has a different number of teeth one from the other and a number of teeth that is different (lower) from the toothed wheels 21 and 22.

The phase changer 37 has an output shaft 42 onto which a pinion 43 is keyed-in that meshes with a fifth wheel 44 that actuates the carousel 7 of the separators 9.

Reference 45 designates a toothed idle roller that meshes with the chains for tensioning them.

The phase changer 37 is equipped with a shaft 46 whose rotation makes the shaft 42 offset with respect to the second shaft 35.

The grooved wheel 23 and the fork 26, together with the two pairs of toothed wheels 21 and 22 and 38 and 39, compose a two-speed mechanical speed gear, designated as a whole with 50, to change the number of rotation revolutions of the second shaft 35 with respect to the number of revolutions of the first shaft 12 and consequently to change the number of revolutions of the separators-carrying carousel with respect to the number of revolutions of the rotating cylindrical wall.

Reference 48 designates a discharging device with rotating vanes to take the bottles and channel them for example onto a not-shown air conveyor.

The machine operation will now be described.

The motor-reducer 11 directly rotates the first shaft 12 at a pre-established speed and then rotates the rotating cylindrical wall that carries on its external face the cradles and the below dischargers.

Figure 3:
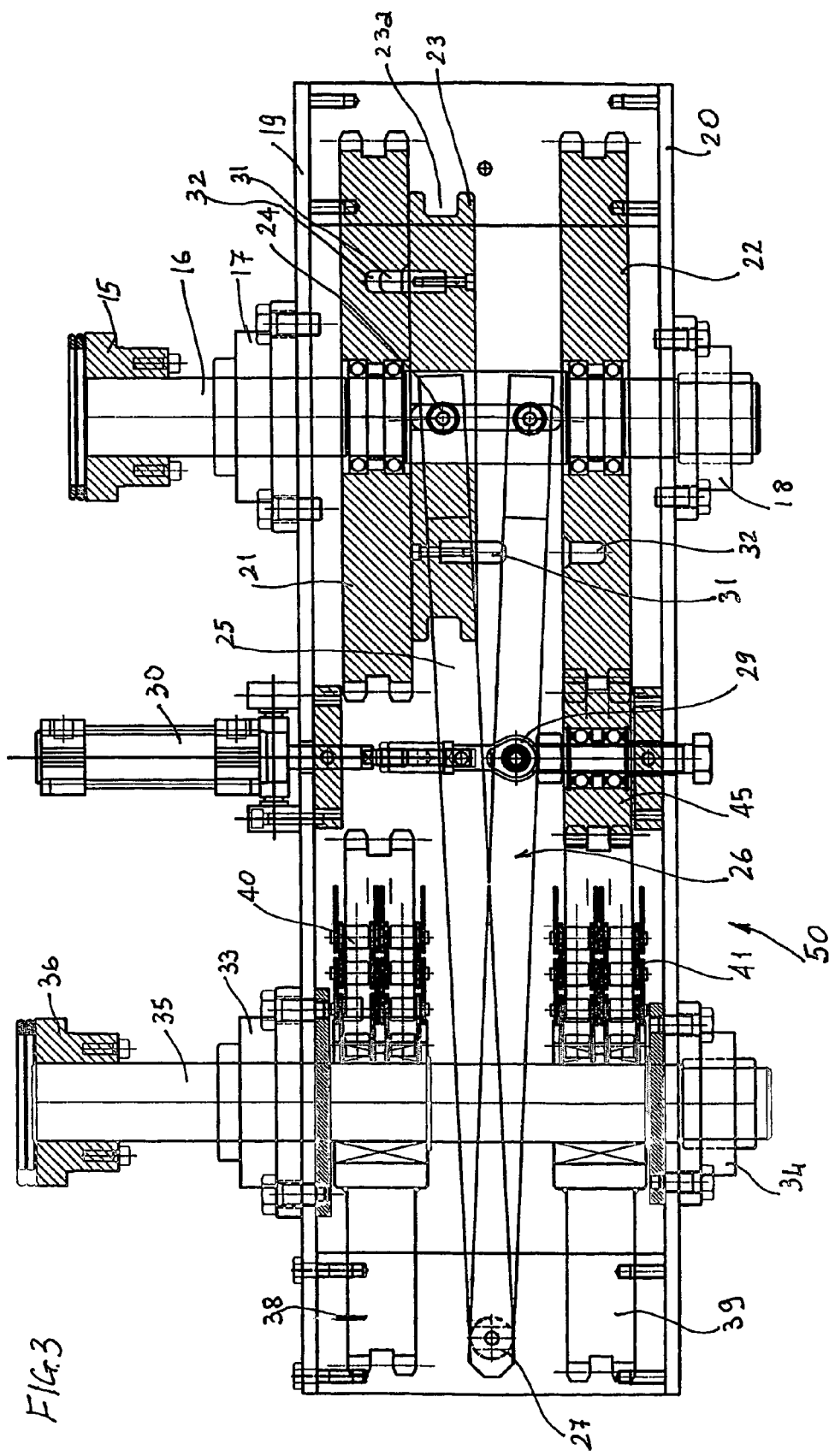
FIG. 3 shows an elevation view of the lower part of the motorization of rotating cylinder and separators-carrying carousel.
Figure 4:
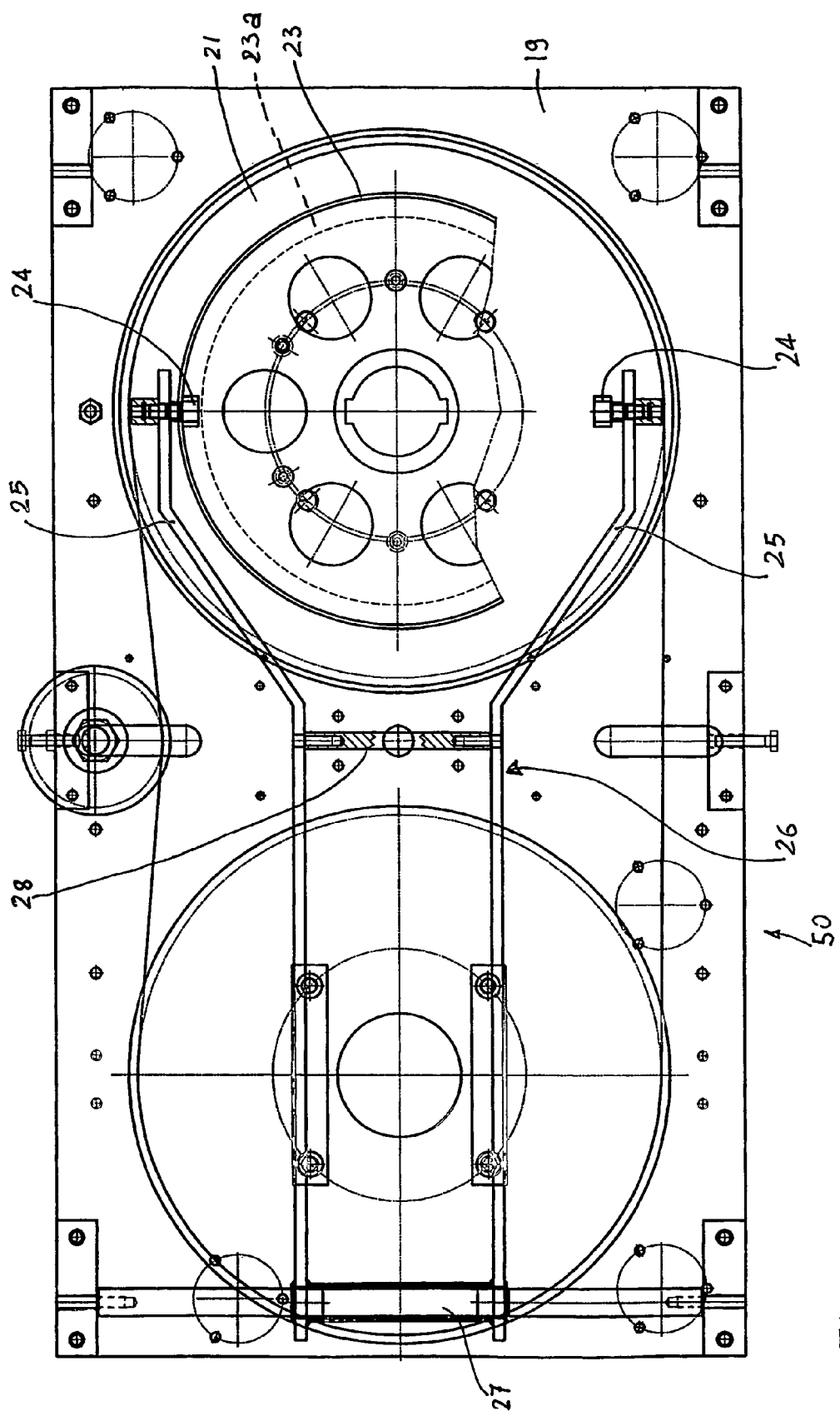
FIG. 4 shows a plan top view the part of FIG. 3.

With the fork in the position shown in FIG. 3, the second shaft 35 is rotated with a predetermined speed ratio given by the number of teeth of the toothed wheel 21 and the toothed wheel 38 and therefore also the separators-carrying carousel will rotate at a pre-established speed depending on the above-said ratio.

In case the speed of the separators-carrying carousel 7 has to be changed with respect to the speed of the cylindrical wall 1 carrying cradles and discharging channels, it will be enough to operate the pneumatic cylinder 30 in order to downward rotate the fork and then take the grooved wheel 23 to mesh with its own stakes with the toothed wheel 22 that will rotate the toothed wheel 39 whose number of teeth is greater than the number of teeth of the above toothed wheel 38.

The toothed wheel 21 will remain idle.

In order to change the phase of the first shaft 35 with respect to the first shaft 12, it will be enough to intervene on the shaft 46 of the phase changer by rotating it by an angle at will depending on the phase shifting that has to be obtained between said two shafts.

With the above-described purely mechanical speed gear 50, the advantage is obtained of always having a manoeuvre repeatability with two well-defined speed ratios between the shafts.

A further advantage that is obtained with the change of said speed ratios is allowing to be able to operate with symmetrical discharging channels 8 with respect to a vertical axis, thereby making it easier for the bottles to fall, such fall being more difficult in case of asymmetrical dischargers.

The invention claimed is:

1. A machine for orienting, straightening and aligning plastic vessels or bottles, comprising:
   a hopper for randomly loading the vessels or bottles, said hopper having a rotating cylindrical wall (1) carrying on its external face a plurality of cradles (5) with below-placed discharging channels (8);
   a carousel (7) with a plurality of separators (9) defining vertical channels or openings (10) that receive the vessels or bottles from said discharging channels; and
   a mechanical speed gear (50) for changing a ratio of a number of revolutions of said carousel with respect to a number of revolutions of said cylindrical wall,
   wherein said mechanical speed gear comprises,
   two idle toothed wheels (21) and (22) on a first motored shaft (12) that rotates said cylindrical wall,
   a grooved wheel (23) that is between said two toothed wheels and that is keyed-in onto said first shaft, said grooved wheel being movable between said two toothed wheels in an axial direction of said first shaft,
   stakes (31) on respective faces of said grooved wheel that are insertable into corresponding seats (32) in said toothed wheels to drive said toothed wheels,
   said toothed wheels being connected through chains (40) and (41) respectively to further toothed wheels (38) and (39) that are keyed-in onto a second shaft (35) that rotates said carousel, and
   a pneumatic cylinder (30) that operates on a fork (26) carrying two rollers (24) that engage a groove (23a) of said grooved wheel.

2. The machine according to claim 1, further comprising a phase changer (37) inserted onto said second shaft to change an angular position between said first shaft and said second shaft.

* * * * *